US011338205B2

(12) United States Patent
Lee et al.

(10) Patent No.: US 11,338,205 B2
(45) Date of Patent: May 24, 2022

(54) GAME ITEM TRANSACTION SYSTEM, MEDIATION SERVER, GAME USER TERMINAL, AND GAME ITEM TRANSACTION METHOD

(71) Applicants: Jung Hoon Lee, Gimpo-si (KR); Seong Min Jeon, Seongnam-si (KR)

(72) Inventors: Jung Hoon Lee, Gimpo-si (KR); Seong Min Jeon, Seongnam-si (KR)

( * ) Notice: Subject to any disclaimer, the term of this patent is extended or adjusted under 35 U.S.C. 154(b) by 50 days.

(21) Appl. No.: 16/767,317

(22) PCT Filed: Dec. 11, 2018

(86) PCT No.: PCT/KR2018/015729
§ 371 (c)(1),
(2) Date: May 27, 2020

(87) PCT Pub. No.: WO2019/117609
PCT Pub. Date: Jun. 20, 2019

(65) Prior Publication Data
US 2020/0406145 A1    Dec. 31, 2020

(30) Foreign Application Priority Data
Dec. 11, 2017  (KR) ........................ 10-2017-0169000

(51) Int. Cl.
*A63F 13/69*    (2014.01)
*A63F 13/79*    (2014.01)
*A63F 13/35*    (2014.01)

(52) U.S. Cl.
CPC .............. *A63F 13/69* (2014.09); *A63F 13/35* (2014.09); *A63F 13/79* (2014.09)

(58) Field of Classification Search
None
See application file for complete search history.

(56) References Cited

U.S. PATENT DOCUMENTS

2009/0318221 A1* 12/2009 Dhunjishaw ........... G06Q 20/04
                                                        463/29
2015/0157942 A1*  6/2015 Ikeda ....................... A63F 13/69
                                                        463/31
2019/0028265 A1*  1/2019 Bisti ...................... G06F 21/602

FOREIGN PATENT DOCUMENTS

JP      2009-254448 A    11/2009
KR   10-2008-0002357 A     1/2008
(Continued)

OTHER PUBLICATIONS

International Search Report for PCT/KR2018/015729 dated Apr. 16, 2019 from Korean Intellectual Property Office.
(Continued)

*Primary Examiner* — Damon J Pierce
(74) *Attorney, Agent, or Firm* — Paratus Law Group, PLLC

(57) ABSTRACT

Disclosed is a game item transaction system comprising: a user terminal for executing game item wallet software for management of game items possessed by a game user, and generating transaction information of a game item possessed by the game user and broadcasting the same over a network; a game server for managing the progress of a game and storing game user IDs, which are identification information of users of the game, and information on game items possessed by the users according to the game user IDs; and a financial server for storing financial account information of game item transaction parties.

9 Claims, 5 Drawing Sheets

(56) References Cited

FOREIGN PATENT DOCUMENTS

KR  10-2011-0117838 A   10/2011
KR  10-2015-0132708 A   11/2015

OTHER PUBLICATIONS

Opskins, "Applying Virtual Money 'Block Chain' Technology to the Game Item Exchange Market . . . 'Strong Security+ Easy Payment' Spotlight", Global Economic, Nov. 14, 2017, pp. 1-3, URL: http://www.g-enews.com/ko-kr/print.php?ud=201711140759377228d6eb469fd3_1&md=20171114082058.

* cited by examiner

GAME ITEM TRANSACTION SYSTEM, MEDIATION SERVER, GAME USER TERMINAL, AND GAME ITEM TRANSACTION METHOD

CROSS-REFERENCE TO PRIOR APPLICATIONS

This application is a National Stage Patent Application of PCT International Patent Application No. PCT/KR2018/015729 (filed on Dec. 11, 2018) under 35 U.S.C. § 371, which claims priority to Korean Patent Application No. 10-2017-0169000 (filed on Dec. 11, 2017), which are all hereby incorporated by reference in their entirety.

BACKGROUND

The present invention relates to a (on-line) game item transaction system using a blockchain, a mediation server, a game user terminal, and a game item transaction method and, more specifically, to a game item transaction system, a mediation server, a game user terminal, and a game item transaction method, capable of transmitting information on transaction between a seller and a buyer of a game item onto a network and, executing change of the owner of the game item and payment of a transaction amount for the game item transaction based on the transaction information extracted from a game item blockchain which is a public account book for a game item transaction.

A stand-alone-type game played in a conventional home console or a personal computer platform is gradually evolved to an online game with development of a network infrastructure and development of a computing technology.

The online game has evolved from an online arcade game which requires simple operations to a game in which each gamer (user) performs a mission by collaborating with another user and has recently become gradually popular among users of various ages, and a genre of an online game also becomes widely varied.

In particular, a MMORPG (Massive Multiplayer Online Role Playing Game) in which a plurality of users are simultaneously got online and play the game by controlling a character of his/her own and interacting with other users or with an NPC(Non-Player Character), has obtained a great popularity.

In the case of the MMORPG, users access the game server through an Internet network to create an account, and the game proceeds by growing his/her character in the game. Growing a character means to increase the level of the character by accumulating experiences of the character, or to increase the ability of the character by obtaining an item. Obtaining a necessary item is very important for users who enjoy the MMORPG, since the ability of the character can be significantly increased by the item (equipment, weapon, etc.) possessed by the character.

On the other hand, as the importance of an item in an online game is increased, it becomes natural that users exchange or trade items each other outside the game. That is, when a notice for selling or buying a game item is posted on a specific bulletin board for a transaction of an online game item, a user who wants to sell or buy the corresponding game item makes a contact to the corresponding seller or buyer, and both users get online in the game to transact the corresponding item in the game and then the buyer pays the price for the item to the seller. The payment of the price is made with a game money or a mainly real money, but various transaction accidents such as taking the money without transferring the game item are constantly occurring.

In order to prevent the problems of the interpersonal game item transaction, a game item transaction between game users is performed through a game item exchange in case of some MMORPG.

However, the details of transactions through the game item exchange is usually stored only in an associated database of the game item exchange server, so that the publicness of the transaction is difficult to be confirmed, and there is a risk that the transaction details may be compromised through hacking or the like. In addition, the transaction of a game item through a game item exchange is inconvenient because the payment is mainly made through a game money rather than a real money. Thus, the game users tend to favor the direct personal transaction of the item, and there is a need for a way to ensure the security of the direct transaction between these individuals.

SUMMARY

The objective of the present invention is to provide a game item transaction system, a mediation server, a game user terminal, and a game item transaction method, characterized in that information on transaction between a seller and a buyer of a game item is transmitted onto a network, and change of the owner of the game item and payment of the transaction amount are executed based on the transaction information extracted from a game item blockchain approved to be valid.

According to an aspect of the present invention, provided is a game item transaction system comprising: a user terminal for executing game item wallet software for management of game items owned by a game user, and generating transaction information of a game item owned by the game user, and broadcasting the same over a network; a game server for managing the progress of a game, and storing game user IDs, which are identification information of users of the game and information on game items owned per the game user ID; and a financial server for storing financial account information of game item transaction parties, wherein the transaction information includes a transaction party ID of a game item seller, a transaction party ID of a game item buyer, information on a game item to be traded, and transaction amount information, wherein the game server updates the information on the game item owned per a game user ID based on a game item blockchain which is a public account book for a game item transaction, and wherein the financial server performs payment of a transaction amount for a game item transaction based on the game item blockchain.

According to another aspect of the present invention, provided is a game user terminal for a game item transaction, wherein a game item wallet software for managing a game item owned by a game user is executed, wherein the game item wallet software generates and broadcasts transaction information for the game item owned by the game user over a network, and the transaction information includes a transaction party ID of a game item seller, a transaction party ID of a game item buyer, information on the game item to be traded, and transaction amount information.

According to another aspect of the present invention, provided is a mediation server for mediating transaction information of a game item transaction, comprising: a database for associating a transaction party ID, a game user ID, and real name information of a game user, wherein the mediation server extracts the game user ID and the real name information of a transaction party from the database based on transaction information newly included in a game item blockchain and including a transaction party ID of a game item seller, a transaction party ID of a game item buyer, information on a game item to be traded and transaction amount information, and transmits the game user ID and the real name information to a game server and a financial server, respectively.

According to another aspect of the present invention, provided is a game item transaction method comprising the steps of: broadcasting new transaction information including a transaction party ID of a game item seller, a transaction party ID of a game item buyer, information on the game item to be traded, transaction amount information over a network; generating a game item block including the new transaction information; connecting the generated game item block to a game item blockchain which is a public account book of game item transactions; extracting the information on the game item and the transaction amount information included in the new transaction information from the game item blockchain approved as valid; obtaining the game user ID on the game and the real name information based on the transaction party ID of the game item transaction party; transmitting the obtained game user ID and the extracted information on the game item to a game server; and transmitting the obtained real name information and the extracted transaction amount information to a financial server.

According to another aspect of the present invention, provided a game item transaction system, comprising: a game item exchange server for generating transaction information for a game item and broadcasting the transaction information over a network; a game server for managing the progress of the game, and storing information on a game item owned per the game user ID; and a financial server for storing financial account information of a game item transaction party, wherein the transaction information includes an exchange ID of the game item exchange server, a transaction party ID of a game item seller, a transaction party ID of a game item buyer, information on the game item to be traded, and transaction amount information, wherein the game item exchange server includes a database for associating a transaction party ID, a game user ID, and real name information of a game user, wherein the game item exchange server extracts, based on the transaction information containing the exchange ID among transaction information newly included in the game item blockchain which is a public account book for game item transactions, the game user ID and the real name information from the database, and transmits the game user ID and the real name information respectively to the game server and the financial server.

A game item block is generated and connected by transmitting information on transaction between a seller and a seller of a game item onto a network, and owner change and transaction amount payment of the item are performed based on the transaction information extracted from the blockchain approved as valid, thereby guaranteeing security and publicness of the interpersonal game item transaction, and reducing the risk of the transaction details being compromised through hacking or the like.

DETAILED DESCRIPTION

Hereinafter, embodiments of the present invention will be described in detail with reference to the accompanying drawings. While the invention has been particularly shown and described with reference to preferred embodiments thereof, it will be understood by those skilled in the art that various modifications may be made to include various other embodiments. It should be noted that the present invention is not limited to the particular embodiment disclosed, but on the contrary, the present invention covers all modifications, equivalents, and alternatives falling within the spirit and scope of the invention.

<Game Item Blockchain>

Figure 1:
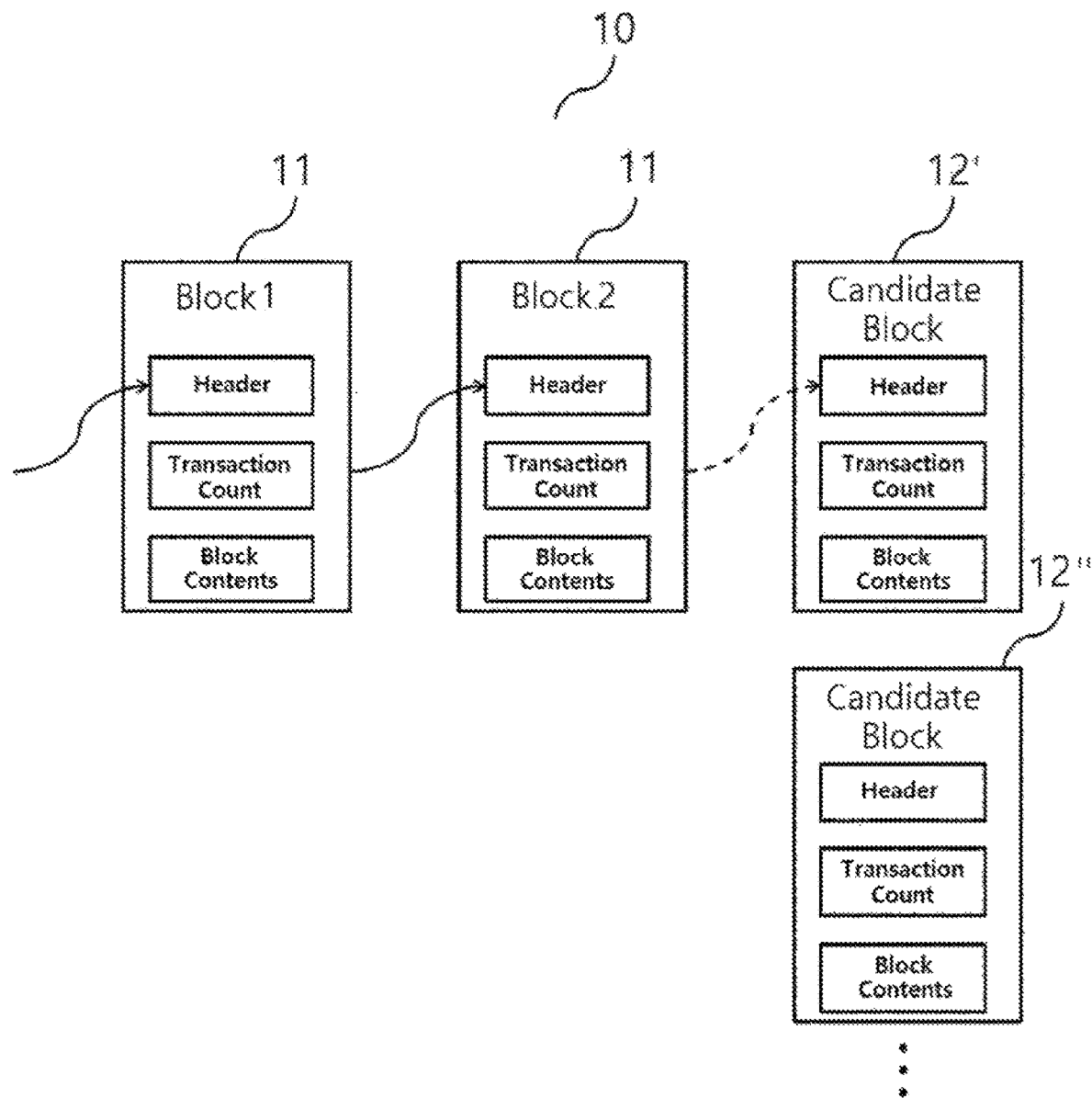
FIG. 1 is a diagram illustrating a blockchain according to an embodiment of the present invention.

FIG. 1 is a diagram illustrating a game item blockchain 10 according to an embodiment of the present invention.

The blockchain is a public account book on a network that is being utilized in a transaction of a virtual currency such as Bitcoin or Ethereum. The blockchain 10 as a public account book to record game item transaction details according to the present invention includes all the details of valid game item transactions, and each block 11 in the blockchain is connected to the previous block in the order of chronology.

The transaction information as game item transaction details recorded in the blockchain 10 includes a transaction party ID of a game item seller, a transaction party ID of a game item buyer, information on a game item to be traded and transaction amount information, and may further include an encrypted game user ID and encrypted real name information, and the like. Here, since the transaction party ID of the game item transaction party does not include information (name, social security number, etc.) on the owner of the game item, the game item transaction according to the present invention basically has anonymity. As described below, when the real name information is included in the transaction information, it is encrypted to be included therein.

In order for such transaction information to be recorded in the blockchain 10, transaction information of a new game item transaction is firstly broadcast over the network. The broadcast transaction information is not immediately validated (i.e., the transaction is not approved) and, as shown in FIG. 1, is firstly stored in a plurality of candidate blocks 12', 12'' . . . generated by a plurality of block generators (not shown) or miners (not shown) on the network. The candidate blocks are generated to include transaction information of new transactions broadcast over the network for a predetermined time period (for example, 10 minutes).

Each block 11 of the blockchain 10 includes a header, a transaction count, and block contents, wherein the header is a summary of the overall contents of the block, and includes information such as a previous block hash or the like indicating a connection relationship with the previous block of the blockchain. The transaction count stores information on how many transaction details (transaction information) are recorded in the corresponding block, and the block contents includes specific information of the transaction details stored in the corresponding block (for example, transaction information according to the present invention).

A candidate block 12' stores a plurality of transaction details broadcast over the network for a predetermined time period after the block (for example, block 2 of FIG. 1) was lastly connected (i.e., validated or approved) to the blockchain. If it is recognized that one or more of the candidate blocks (12', 12" . . . ) generated by the plurality of block generators or miners during the predetermined time period are identical to each other, the corresponding candidate block is connected to the blockchain, and the plurality of transaction details included in the corresponding block are approved as valid transactions.

The blockchain to which this new transaction details are added is broadcast over the network and distributed to all wallet users, including various nodes on the network (block generators, miners, user terminals, mediation servers, game servers, financial servers, exchange servers, etc.). The seller and the buyer are able to confirm, via their game item wallet software, that the transaction of the corresponding game item is validated on the game item blockchain. According to the present invention, the transaction information of the game item is not stored in the central database but is recorded in the blockchain which is a distributed public account book, thereby guaranteeing security and publicness of the game item transaction.

Hereinafter, a specific embodiment of the game item transaction system of the present invention using the game item blockchain 10 will be described.

First Embodiment

Figure 2:
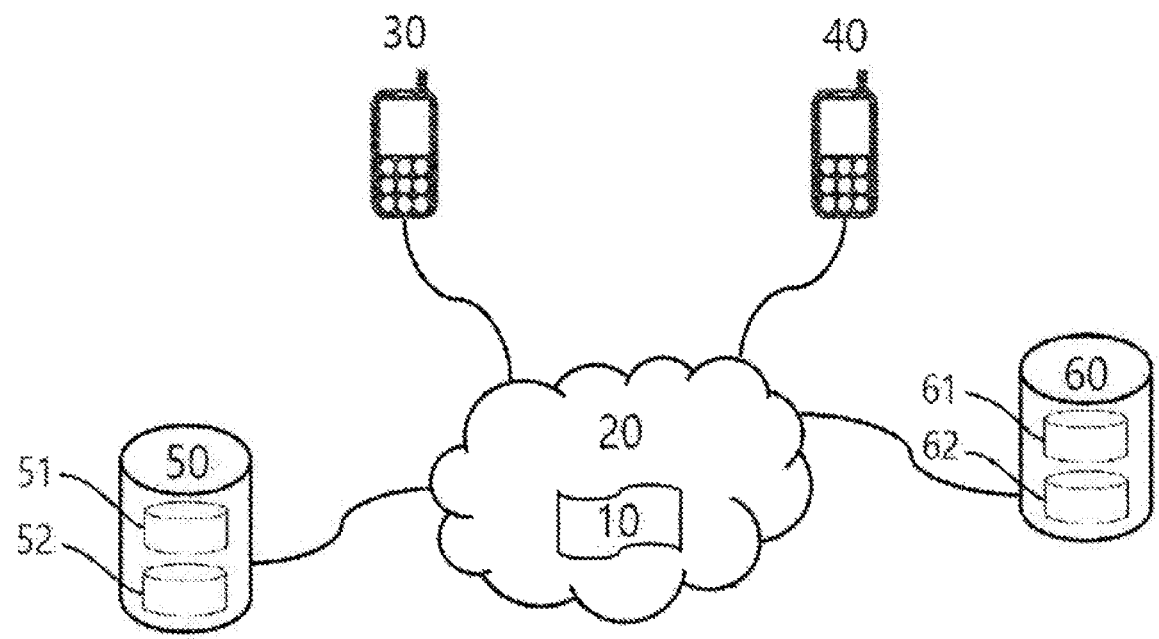
FIG. 2 is a block diagram illustrating a configuration of a game item transaction system according to a first embodiment of the present invention.

FIG. 2 is a block diagram illustrating a configuration of a game item transaction system according to a first embodiment of the present invention.

A game item transaction system according to the first embodiment of the present invention comprises, an user terminal (for example, a seller terminal 30 and a buyer terminal 40) connected to a network 20 to generate and broadcast transaction information of a game item; a game server 50 for performing the progress of the game and managing a game item; and a financial server 60 for performing payment processing according to the game item transaction.

The user terminals 30 and 40 are installed with game item wallet software for managing a game item owned by a game user, and generates transaction information for a game item owned by the game user according to a predetermined protocol and broadcasts the transaction information over the network 20. Such transaction information includes the transaction party ID of the game item seller, the transaction party ID of the game item buyer, the information on the game item to be traded, and the transaction amount information, and may further include the encrypted game user ID (the ID used in the connection with the game, which is distinguished from the transaction party ID) and the encrypted real name information (for example, name, social security number, account information, etc.) depending on specific practicing circumstances. The information on the game item may include information (game name) on the game to which the game item to be traded belongs and an item name.

Once the transaction information is broadcast from the user terminals 30, 40 over the network 20, the transaction information is recorded to the candidate blocks 12', 12", . . . by a plurality of miners or block generators on the network, and if it is approved that the corresponding candidate block is valid, as described above, the corresponding candidate block is connected to the game item blockchain 10. Accordingly, the transaction information (transaction details) included in the corresponding candidate block is confirmed or approved as valid transaction information.

The updated game item blockchain 10 is thus broadcast over the network and distributed to a plurality of network nodes, including the game server 50 and the financial server 60.

The game server 50 is a server for performing and managing the progress of the corresponding game, and updates information on the game item owned per a game user ID based on the game item blockchain 10, which is a public account book for the game item transaction. That is, the game server 50 includes a control unit 51 for controlling a process of updating owner information of the game item, and a database 52 for associating a transaction party ID with a game user ID, wherein the control unit 51 of the game server 50 extracts the transaction party ID of a seller, the transaction party ID of a buyer, and the information on the game item from the transaction information recorded in the game item blockchain 10. The control unit 51 of the game server 50 obtains the game user IDs of the seller and the buyer from the database 52 based on the extracted transaction party ID of the seller and the transaction party ID of the buyer. In addition, based on the extracted information on the game item, a process for changing the owner of the corresponding game item from the game user ID of the game item seller to the game user ID of the buyer is performed.

On the other hand, depending on the specific practicing circumstances, if there is an encrypted game user ID in the transaction information extracted from the game item blockchain 10, the search of the database 52 for finding the associated game user ID may be omitted, because the game user ID can be obtained by reading out the game user ID in a predetermined manner.

The financial server 60 performs payment of the transaction amount of the corresponding game item based on the game item blockchain 10, which is a public account book for the game item transaction. The financial server 60 includes a control unit 61 for controlling the payment process of the game item transaction, and a database 62 for associating the transaction party IDs of the seller/buyer with their real name information. The control unit 61 of the financial server 60 extracts the transaction party ID of the seller, the transaction party ID of the buyer and transaction amount information from the new transaction information of the game item blockchain 10. The control unit 61 of the financial server 60 obtains the real name information (name, social security number, account number, credit card number, etc.) of the seller/buyer from the database 62 based on the extracted seller/buyer's transaction party IDs, and performs the payment of the transaction amount corresponding to the transaction amount information included in the transaction information from the financial account of the buyer to the financial account of the seller based on the obtained real name information. The payment of the transaction amount can be accomplished by a variety of methods, such as a wire transfer, credit card, virtual currency remittance, etc. according to a specific embodiment. In addition, the financial server 60 may periodically send information on the transaction amount payment successfully carried out to the IRS server (not shown).

On the other hand, if the encrypted real name information is included in the transaction information extracted from the game item blockchain 10 depending on the specific embodiment, the search of the database 62 for finding the real name information associated with the transaction party ID may be omitted since the names, the social security numbers, and the account numbers of the seller and the buyer can be read out in a predetermined manner.

When the change of the game item owner by the game server 50 and the payment process by the financial server 60 are successfully performed, the control unit 51 of the game server 50 and the control unit 61 of the financial server 60 can transmit the transaction completion message to the user terminals 30 and 40 through the short text message SMS or the e-mail. Accordingly, the transaction by the game item transaction system according to the first embodiment of the present invention is completed.

In the present embodiment, by broadcasting the transaction information of the game item over the network through the user terminals 30 and 40, the transaction information of the game item transaction newly made can be updated in the game item blockchain 10, and the game server 50 and the financial server 60 perform the change of the game item owner and payment processing of the transaction amount based on the transaction information of the game item transaction approved to be valid, thereby guaranteeing the publicness and security of the game item transaction.

Although the game server 50 and the financial server 60 are described to be separate from each other, the present invention is not limited thereto, and the game server 50 and the financial server 60 may be integrated.

Second Embodiment

Figure 3:
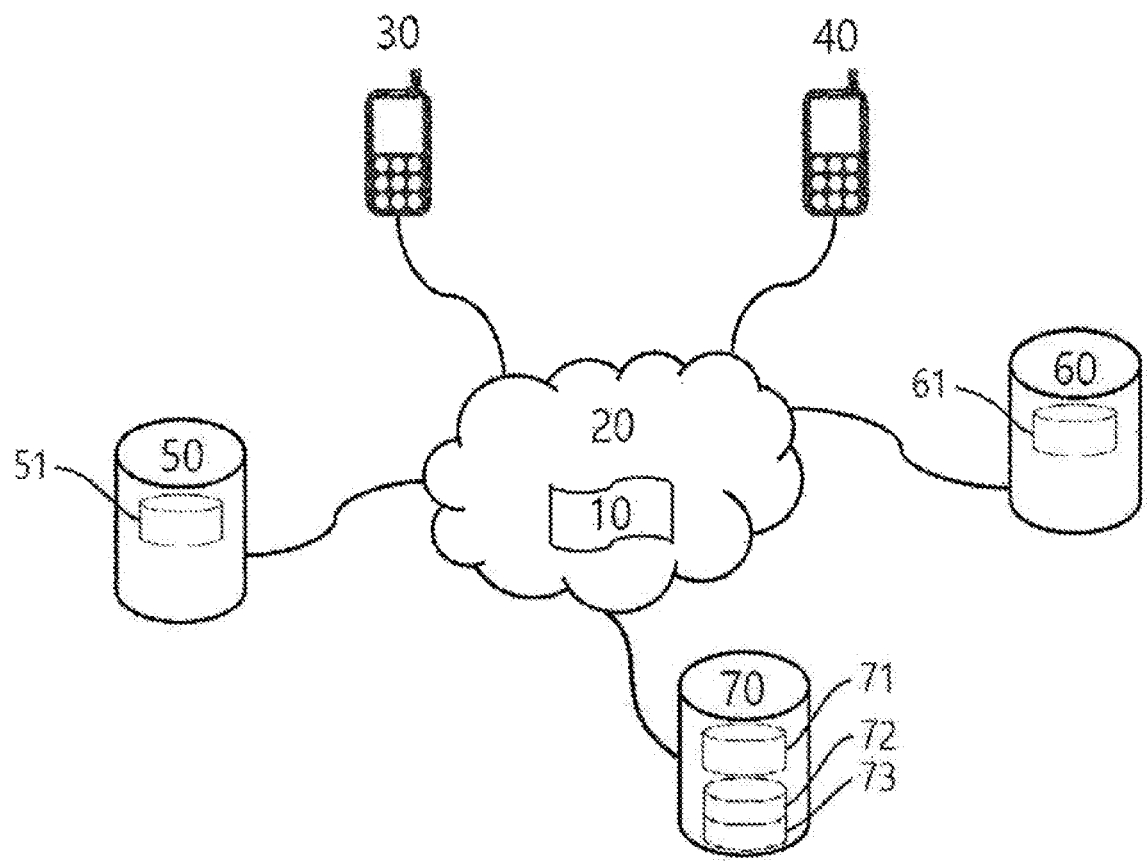
FIG. 3 is a block diagram illustrating a configuration of a game item transaction system according to a second embodiment of the present invention.

FIG. 3 is a block diagram illustrating a configuration of a game item transaction system according to a second embodiment of the present invention.

Hereinafter, a game item transaction system according to a second embodiment of the present invention will be described with reference to FIG. 3.

As shown in FIG. 3, the game item transaction system according to the second embodiment is different from the game item transaction system according to the first embodiment of the present invention in that a mediation server 70 for a game item transaction is added. Hereinafter, this difference will be described mainly, and a description of the same or similar elements will be omitted.

The mediation server 70 includes a control unit 71 for performing a transaction information mediation processing by extracting relevant transaction information from the game item blockchain 10 and providing the transaction information to the game server 50 and the financial server 60, a first database 72 for associating transaction party IDs of the seller/buyer of the game item with the game user IDs of the game, and a second database 73 for associating the transaction party IDs of the seller/buyer of the game item with the real name information.

The control unit 71 of the mediation server 70 extracts the transaction information of the new game item transaction from the game item blockchain 10. And, based on the transaction party IDs of the seller/buyer of the game item from the extracted transaction information, the game user IDs of the seller/buyer are obtained from the first database 72. The control unit 71 transmits the obtained game user IDs of the seller/buyer and the information on the game item of the extracted transaction information to the game server 50.

The control unit 51 of the game server 50 performs a changing processing that the owner of the corresponding game item is changed from the seller to the buyer based on the game user IDs of the seller/buyer of the game item transaction and the information on the game item received from the mediation server 70. In the second embodiment, since the mediation server 70 obtains the game user IDs of the seller/buyer from the first database 72, the game server 50 does not need to have a database for associating the transaction party ID with the game user ID.

Depending on specific practicing circumstances, if the encrypted game user ID is present among the transaction information extracted from the game item blockchain 10, the search of the first database 72 for finding the associated game user ID may be omitted because the game user ID can be obtained by reading out the game user ID in a predetermined manner.

The control unit 71 of the mediation server 70 obtains the real name information of the seller/buyer from the second database 73 based on the transaction party IDs of the seller/buyer of the game item among the transaction information extracted from the game item blockchain 10. The control unit 71 transmits the transaction amount information of the extracted transaction information and the obtained real name information of the seller/buyer (name, social security number, account number, credit card number, etc.) to the financial server 60.

The control unit 61 of the financial server 60 performs a payment processing of the transaction amount from the buyer to the seller based on the transaction amount information and the real name information of the seller/buyer of the game item transaction received from the mediation server 70. In the second embodiment, since the mediation server 70 obtains the real name information of the seller/buyer from the second database 73, the financial server 60 does not need to have a database for associating the transaction party ID with the real name information.

Depending on specific practicing circumstances, if the encrypted real name information is present among the transaction information extracted from the game item blockchain 10, the search of the second database 73 for finding the real name information associated with the transaction party ID may be omitted since the names, the social security numbers, the account numbers, etc. of the seller and the buyer can be obtained by reading out in a predetermined manner.

In the above-described embodiment, the first database 72 and the second database 73 may be integrated into a single database in order to guarantee the security of the payment process of the transaction amount and the changing process of the owner of the game item.

In addition, in the second embodiment, because the mediation server 70 can extract the transaction information for the new game item transaction from the game item blockchain to provide relevant information (information on game item, game user ID, real name information, transaction amount information) that the game server 50 and the financial server 60 can directly process, the game server 50 and the financial server 60 may have a conventional server system architecture. That is, since the mediation server 70 mediates the game item blockchain and the game server 50 and the financial server 60, only the mediation server 70 is provided with a system (database) by which transaction information can be extracted from the game item blockchain.

Third Embodiment

Figure 4:
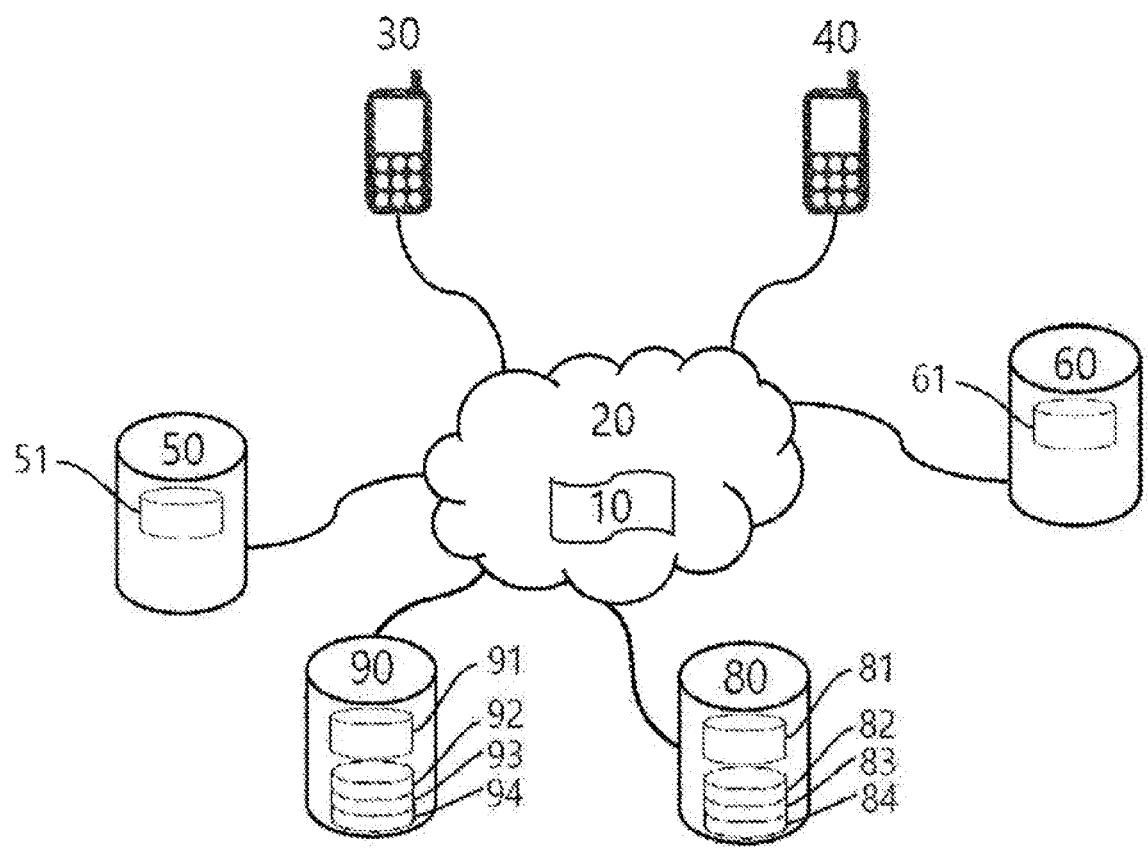
FIG. 4 is a block diagram illustrating a configuration of a game item transaction system according to a third embodiment of the present invention.

FIG. 4 is a block diagram illustrating a configuration of a game item transaction system according to a third embodiment of the present invention.

A configuration of a game item transaction system is described, assuming that a plurality of game item exchange servers (hereinafter, referred to as "exchange server") 80, 90 exist. Although two game item exchange servers are shown and described below with reference to FIG. 4, there may be many more game item exchange servers. The game item transaction system according to the third embodiment differs from the game item transaction system according to the first embodiment and the second embodiment in that the exchange servers 80 and 90 for the game item transaction broadcast the transaction information of the game item over the network and transfer the transaction information reflected in the game item blockchain 10 to the game server 50 and the financial server 60. Hereinafter, these differences will be described primarily, and detailed descriptions of the same or similar elements will be omitted.

First, in the game item transaction system according to the third embodiment, the seller and the buyer of the game item use the user terminals 30 and 40 to login with their own transaction party IDs to the exchange servers 80 and 90, and transmit information on the game item to be sold or purchased. The information on the game item may include information (game name) on a game to which a game item to be traded belongs and the item name.

The exchange servers 80 and 90 are installed with "game item transaction software" corresponding to the game item wallet software of the first embodiment and the second embodiment for managing the game item owned by the game user, generating transaction information for the game item, and broadcasting the transaction information over the network. The game item transaction software is assigned a unique identification number such as the exchange ID for each exchange. In other words, unlike the first embodiment and the second embodiment, rather than generating and broadcasting the transaction information described above by the user terminals 30 and 40, the exchange servers 80 and 90 to which the seller and the buyer of the game item subscribe and login, generate and broadcast transaction information over the network.

Specifically, if the seller and the buyer login to the particular exchange server 80 using the respective transaction party ID, the control unit 81 of the corresponding exchange server 80 compares the login information with the information stored in a first database 82 to determine whether they are registered valid users. If the control unit 81 determines that they are registered valid users, the login to the exchange server 80 is permitted and the login is completed. The transaction party ID may be different from the game user ID for actually logging into the game server 50. However, depending on specific practicing circumstances, the game server 50 and the exchange servers 80 and 90 may be physically the same, and the transaction party ID and the game user ID may be the same. Hereinafter, for the convenience of description of the present invention, the game server 50 and the exchange servers 80 and 90 will be conceptually separated, and the transaction party ID will be described distinctively from the game user ID. However, it should be noted that the invention is not limited to this embodiment.

Next, the seller registers the game item to be sold to the particular exchange server 80. That is, the exchange server 80, which receives the information on the game item and the desired amount information from the seller, determines whether the game item to be sold is valid in the game server 50 based on a second database 83 in which the information associating the transaction party ID and the game user ID is stored, and registers the game item to be sold in the exchange server 80 if it is valid.

The buyer also logs in to the particular exchange server 80 using the transaction party ID, and searches for the desired game item from the game items registered in the exchange server 80, and transmits the information indicating the intention to buy to the exchange server 80 when the desired game item exists. The buyer may look for the desired game item by searching for the desired game item according to a UI implementation of the exchange server, or by selecting from a list of game items to be sold registered in the exchange server 80.

When a transaction amount for a particular game item is agreed by the seller and the buyer, the control unit 81 of the exchange server 80 generates and broadcasts transaction information including the exchange ID, transaction party IDs of the seller and the buyer, the information on the game item, and the transaction amount information over the network 20. As described above, the transaction information may further include an encrypted game user ID and encrypted real name information, and a detailed description thereof will be omitted.

The new transaction information broadcast from the exchange server 80 over the network 20 is recorded in the game item candidate blocks 12', 12'', . . . by miners or block generators, and if it is recognized that the corresponding candidate block is valid, as described above, the corresponding candidate block is connected to the previous blockchain, and the transaction information (transaction details) included in the corresponding candidate block is approved to be valid.

The exchange server 80 obtains the game user ID from the second database 83 based on the transaction party ID extracted from the transaction information including its exchange ID in the transaction information of the successfully approved game item blockchain 10, and transmits the same to the game server 50 along with the information on the game item.

The control unit 51 of the game server 50 performs an owner-changing processing of the corresponding game item according to the received game user ID and the information on the game item. In the third embodiment, since the exchange server 80 obtains the game user IDs of the seller/buyer from the second database 83, the game server 50 does not need to have a database for associating the transaction party ID with the game user ID.

In addition, the exchange server 80 obtains the real name information of the seller and the buyer (name, social security number, account number, etc.) from a third database 84, which is a database associating the transaction party ID and the real name information, based on the transaction party ID extracted from the transaction information including its exchange ID in the transaction information of the successfully approved game item blockchain 10. The control unit 81 of the exchange server 80 transmits the obtained transaction party ID, the transaction amount information and the real name information stored in the third database 84 to the financial server 60.

The control unit 61 of the financial server 60 performs a payment processing, such as a wire transfer, based on the real name information and the transaction amount information received from the exchange server 80, thereby completing the game item transaction. In the third embodiment, since the exchange server 80 obtains the real name information of the seller/buyer from the third database 84, the financial server 60 does not need to have a database for associating the transaction party ID with the real name information.

Although another exchange server 90 with "Game Item Transaction Software" may extracts the transaction information from the game item blockchain 10, the exchanger server 90 cannot request the owner change and the payment process to the game server 50 and the financial server 60 based on the transaction information, because the second database 93 and the third database 94 of the exchange server 90 do not have information associating the transaction party ID and the game user ID and information associating the transaction party ID and the real name information (this is because the seller and the buyer have not previously registered them in the databases in advance). That is, since the exchange servers on the network have an unique database associated with the transaction party who has traded the game item through the corresponding exchange, the owner change and the payment processing of the game item is possible only for the transaction information including the exchange ID in the transaction information recorded in the game item blockchain.

<Game Item Transaction Method>

Figure 5:
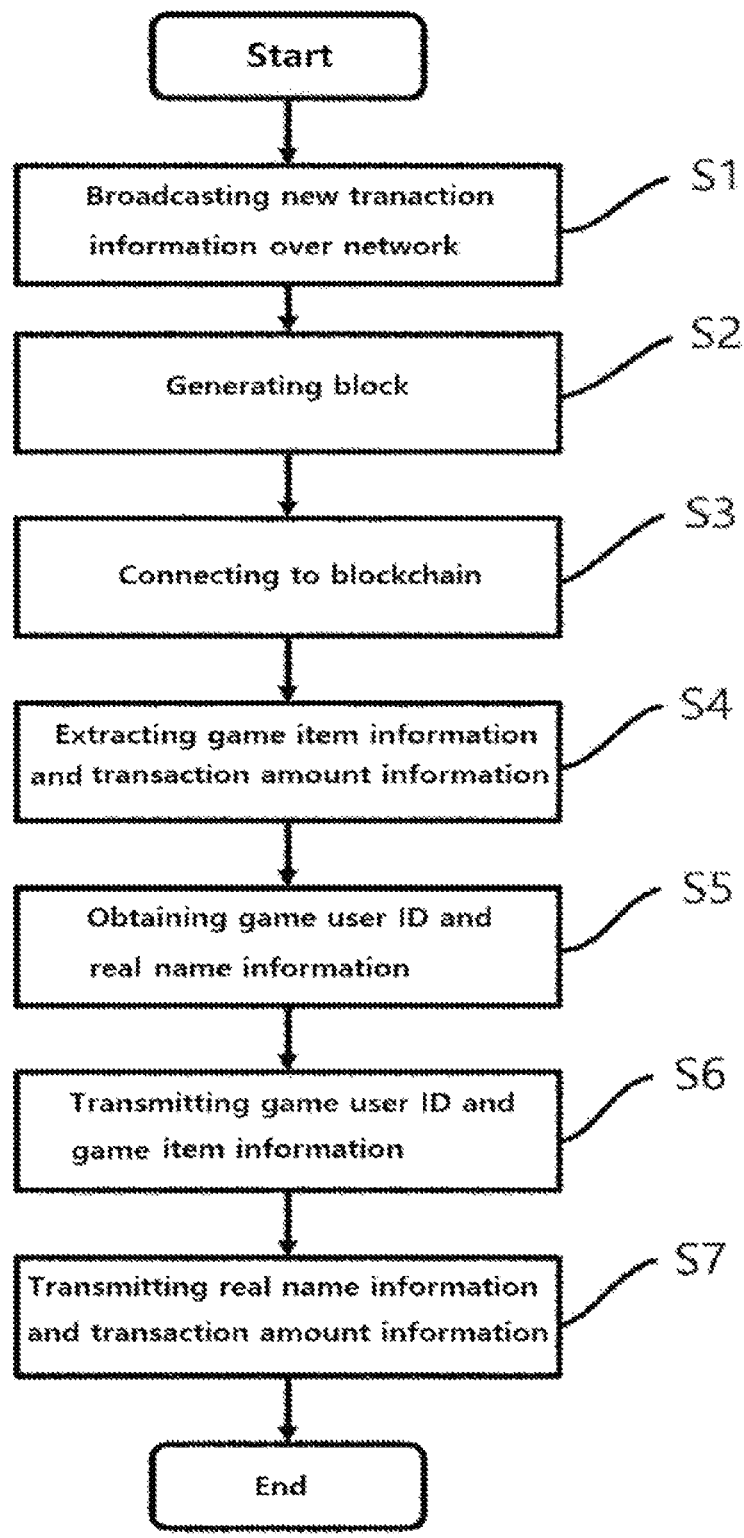
FIG. 5 is a flowchart illustrating a game item transaction method according to the present invention.

FIG. 5 is a flowchart illustrating an example of a game item transaction method according to the present invention.

First, a new transaction information including a transaction party ID of a game item seller, a transaction party ID of a game item buyer, information on the game item to be traded, and transaction amount information is broadcast over a network from an user terminal of a game item transaction party (S1).

Next, a game item candidate block including new transaction information is generated (S2).

Next, the generated game item candidate block is connected to a game item blockchain which is a public account book of a game item transaction (S3).

Next, based on the transaction party ID of the game item transaction party, the game user ID on the game and the real name information are obtained from the first database and the second database (S5).

Next, the obtained game user ID and the extracted information on the game item are transmitted to the game server (S6).

Finally, the obtained real name information and the extracted transaction amount information are transmitted to the financial server (S7).

In step S6, assuming the use of the mediation server 70, the mediation server 70 obtains the game user ID on the game based on the transaction party ID of the game item transaction party and transmit the obtained game user ID together with the extracted information on the game item to the game server (the second embodiment), but as described above, in the first embodiment, this operation is done directly by the game server 50.

Similarly, in step S7, assuming the use of the mediation server 70, the mediation server 70 obtains the real name information based on the transaction party ID of the game item transaction party, and transmits it to the financial server 60 along with the extracted transaction amount information (the second embodiment), but as described above, in the first embodiment, this operation is performed directly by the financial server 60.

As such, through the game item transaction using the game item wallet software installed in the user terminal and the game item blockchain as a public account book, security and publicness of the interpersonal game item transaction can be secured, and the risk of the transaction details to be compromised by hacking and the like can be reduced, and the publicness of the game item transaction can be induced.

The invention claimed is:

1. A game item transaction system comprising:
 a user terminal for executing a game item wallet software for managing a game item owned by a game user, and generating transaction information of the game item owned by the game user, and broadcasting the transaction information over a network;
 a game server for managing a progress of a game, and storing game user IDs, which are identification information of users of the game and information on game items owned per a game user ID;
 a financial server for storing financial account information of game item transaction parties, and
 a mediation server for mediating information on game item transactions,
 wherein the transaction information includes transaction party IDs of the game item transaction parties, information on a game item to be traded, and transaction amount information,
 wherein the mediation server extracts new transaction information from a game item blockchain, which is a public account book for a game item transaction and is generated based on the transaction information broadcast from the user terminal over the network, and transmits first information including the information on the game item to be traded obtained from the new transaction information to the game server, and transmits second information including the transaction amount information obtained from the new transaction information to the financial server,
 wherein the game server updates the information on the game item owned per the game user ID based on the first information, and
 wherein the financial server performs payment of a transaction amount for the game item transaction based on the second information.

2. The game item transaction system of claim 1, wherein the payment of the transaction amount is made by any one of payment methods including a wire transfer, a credit card, and a virtual currency remittance.

3. The game item transaction system of claim 1, wherein the mediation server includes a database associating the transaction party IDs, the game user IDs, and real name information of the game item transaction parties.

4. The game item transaction system of claim 3, wherein the mediation server obtains the game user IDs of the game item transaction parties from the database based on the transaction party Ds included in the new transaction information, and transmits the first information including the game user IDs of the game item transaction parties and the information on the game item to be traded to the game server.

5. The game item transaction system of claim 4, wherein the mediation server obtains the real name information of the game item transaction parties from the database based on the transaction party IDs included in the new transaction information, and transmits the second information including the real name information and the transaction amount information to the financial server.

6. The game item transaction system of claim 1, wherein the transaction information further includes encrypted game user es of the game item transaction parties.

7. The game item transaction system of claim 1, wherein the transaction information further includes encrypted real name information of the game item transaction parties.

8. A game item transaction method comprising the steps of:
broadcasting new transaction information including transaction party IDs of game item transaction parties, information on a game item to be traded, transaction amount information over a network, wherein the new transaction information is used to generate a game item block and the game item block is connected to a game item blockchain which is a public account book of a game item transaction;
extracting the new transaction information from the game item blockchain approved as valid;
obtaining the information on the game item to be traded and the transaction amount information from the new transaction information;
transmitting first information including the information on the game item to be traded to a game server;
transmitting second information including the transaction amount information to a financial server;
updating the information on the game item owned per a game user ID based on the first information; and
performing payment of a transaction amount for the game item transaction based on the second information,
wherein a mediation server performs the steps of extracting the new transaction information, obtaining the information on the game item to be traded and the transaction amount information, transmitting the first information, and transmitting the second information.

9. The game item transaction method of claim 8, wherein the mediation server includes a database associating the transaction party Ds of the game item transaction parties, game user IDs, and real name information,
the game item transaction method further including the steps of:
obtaining the game user IDs and the real name information of the game item transaction parties based on the transaction party IDs included in the new transaction information;
transmitting the first information including the game user IDs of the game item transaction parties and the information on the game item to be traded to the game server; and,
transmitting the second information including the transaction amount information and the real name information of the game item transaction parties to the financial server.

* * * * *